(12) United States Patent
Ishida et al.

(10) Patent No.: US 10,885,498 B2
(45) Date of Patent: Jan. 5, 2021

(54) ATTENDANCE REGISTRATION DEVICE, ATTENDANCE REGISTRATION METHOD, AND RECORDING MEDIUM

(71) Applicant: CASIO COMPUTER CO., LTD., Tokyo (JP)

(72) Inventors: Toshitatsu Ishida, Hachioji (JP); Taro Ejiri, Koganeishi (JP); Tatsuzi Ichikawa, Kawague (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/170,797

(22) Filed: Oct. 25, 2018

(65) Prior Publication Data
US 2019/0130363 A1    May 2, 2019

(30) Foreign Application Priority Data
Oct. 30, 2017   (JP) ................................ 2017-208850

(51) Int. Cl.
*G06Q 10/10*   (2012.01)
*G06K 7/10*   (2006.01)
(Continued)

(52) U.S. Cl.
CPC ..... *G06Q 10/1091* (2013.01); *G06K 7/10297* (2013.01); *G06K 7/10415* (2013.01);
(Continued)

(58) Field of Classification Search
CPC .. G06Q 10/109; G06Q 10/1091; G06Q 10/10; G06F 3/0482; G06F 3/0488; G06K 7/10; G06K 7/10297; G06K 7/10415
(Continued)

(56) References Cited

U.S. PATENT DOCUMENTS

| 5,459,657 | A | * | 10/1995 | Wynn | ................. | G06Q 10/109 |
|           |   |   |         |      |                 | 705/32 |
| 6,016,303 | A | * | 1/2000  | Yoshida | ............. | G11B 7/24056 |
|           |   |   |         |      |                 | 369/283 |

(Continued)

FOREIGN PATENT DOCUMENTS

| JP | H0944713 A    | 2/1997 |
| JP | 2008112416 A  | 5/2008 |

(Continued)

OTHER PUBLICATIONS

Extended European Search Report (EESR) dated Feb. 12, 2019 issued in counterpart European Application No. 18202374.7.
(Continued)

*Primary Examiner* — Andrew Joseph Rudy
(74) *Attorney, Agent, or Firm* — Holtz, Holtz & Volek PC

(57) ABSTRACT

An attendance registration device including a processor that executes:
a reception process of receiving input according to a first method or input according to a second method of identification information corresponding to a target person whose attendance needs to be registered; and
a registration process of registering attendance by associating the identification information received in the reception process with an attendance type input at a predetermined timing,
wherein in the registration process, an attendance type input prior to the input of the identification information is subjected to attendance registration in association with the identification information when an input method of the identification information whose input has been received in the reception process is the first method, and an attendance type input after the input of the identification information is subjected to attendance registration in association with the identification infor-
(Continued)

mation when the input method of the identification information whose input has been received in the reception process is the second method.

20 Claims, 19 Drawing Sheets

(51) Int. Cl.
    *G06F 3/0482*      (2013.01)
    *G06F 3/0488*      (2013.01)

(52) U.S. Cl.
    CPC ......... *G06Q 10/109* (2013.01); *G06F 3/0482* (2013.01); *G06F 3/0488* (2013.01)

(58) Field of Classification Search
    USPC ...................................... 705/30, 32
    See application file for complete search history.

(56) References Cited

U.S. PATENT DOCUMENTS

| | | | | |
|---|---|---|---|---|
| 7,099,236 | B2* | 8/2006 | Yamagishi | G07C 1/10 |
| | | | | 368/10 |
| 7,233,919 | B1* | 6/2007 | Braberg | G06Q 10/10 |
| | | | | 705/32 |
| 8,121,912 | B2* | 2/2012 | Pappas | G06Q 10/105 |
| | | | | 705/30 |
| 8,190,135 | B2* | 5/2012 | Gupta | H04L 67/18 |
| | | | | 455/414.3 |
| 8,577,895 | B2* | 11/2013 | Gupta | H04L 51/043 |
| | | | | 707/748 |
| 8,971,932 | B2* | 3/2015 | Mapes | G06Q 50/18 |
| | | | | 455/456.5 |
| 9,141,943 | B2* | 9/2015 | Collins | G06Q 10/109 |
| 9,436,933 | B2* | 9/2016 | Pappas | G06Q 10/109 |
| 9,584,511 | B2* | 2/2017 | Bauchspies | H04L 63/0861 |
| 9,940,607 | B2* | 4/2018 | Pang | H04W 4/80 |
| 10,021,106 | B1* | 7/2018 | Saylor | H04L 63/107 |
| 2002/0133725 | A1* | 9/2002 | Roy | G07C 9/37 |
| | | | | 726/5 |
| 2007/0094109 | A1* | 4/2007 | Perry | G06Q 10/109 |
| | | | | 705/32 |
| 2007/0250379 | A1* | 10/2007 | Pappas | G06Q 10/105 |
| | | | | 705/32 |
| 2008/0065396 | A1* | 3/2008 | Marshall | G06Q 10/10 |
| | | | | 705/16 |
| 2009/0248551 | A1 | 10/2009 | Taylor et al. | |
| 2009/0248552 | A1 | 10/2009 | Taylor et al. | |
| 2009/0248553 | A1 | 10/2009 | Taylor et al. | |
| 2016/0110833 | A1* | 4/2016 | Fix | G06Q 10/109 |
| | | | | 705/324 |

FOREIGN PATENT DOCUMENTS

| | | |
|---|---|---|
| JP | 2016057661 A | 4/2016 |
| JP | 2017004423 A | 1/2017 |

OTHER PUBLICATIONS

Japanese Office Action (and English language translation thereof) dated Feb. 18, 2020 issued in Japanese Application No. 2017-208850.

* cited by examiner

| 151 | 152 | 153 | 154 |
|---|---|---|---|
| EMPLOYEE NUMBER | NAME | IC CARD ID | POSITION |
| 3847 | ICHIRO SATO | 28343947 | MANAGER |
| 3864 | HANAKO TANAKA | — | STAFF |
| ... | ... | ... | ... |

| 161 | 162 | 163 | 164 | 165 |
|---|---|---|---|---|
| EMPLOYEE NUMBER | ATTENDANCE DATE | ATTENDANCE TIME | ATTENDANCE TYPE | SERVER REGISTRATION |
| 3847 | 20171010 | 160054 | CHECK-IN | N |
| 3864 | 20171010 | 161123 | CHECK-IN | N |
| ... | ... | ... | ... | ... |

ATTENDANCE REGISTRATION

IZAKAYA
UMAI

10 OCTOBER 2017 (TUESDAY)

16:00

SELECT ATTENDANCE TYPE TO BE
REGISTERED AND TOUCH WITH IC CARD

| CHECK-IN | CHECK-OUT | BREAK START | BREAK END |

| SELECT BY NUMBER | SELECT BY NAME |

INPUT OF EMPLOYEE NUMBER

| 1 | 2 | 3 |
| 4 | 5 | 6 |
| 7 | 8 | 9 |
| C | 0 | |

OK

412

540

FIG. 12
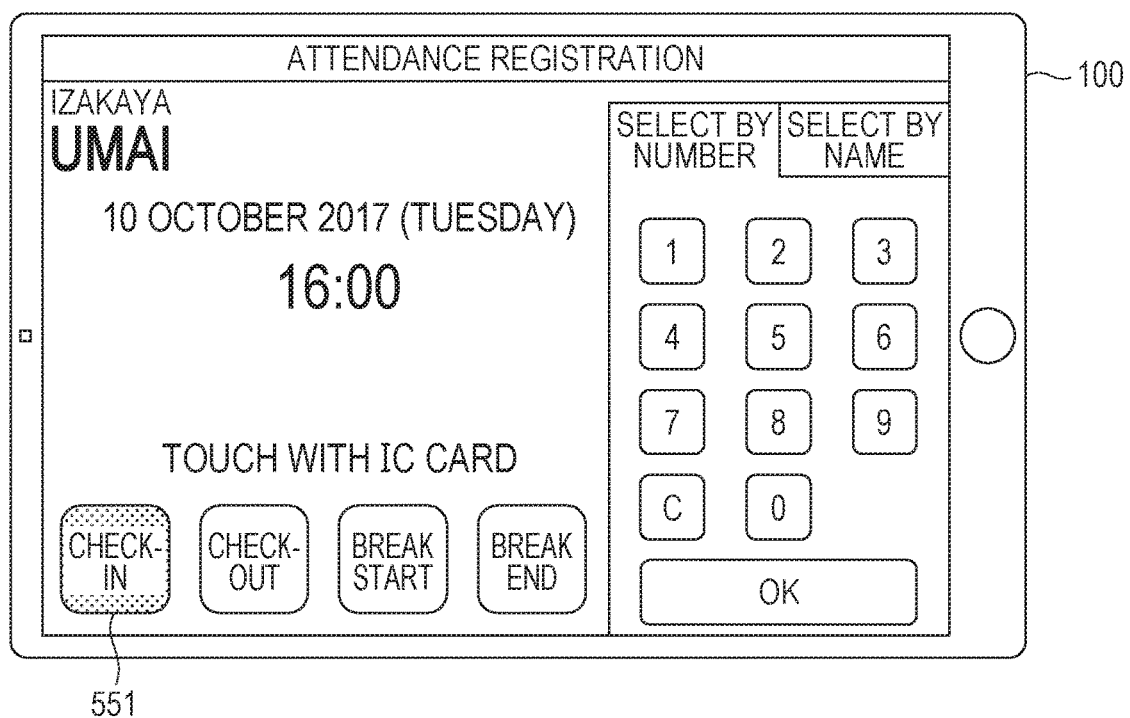
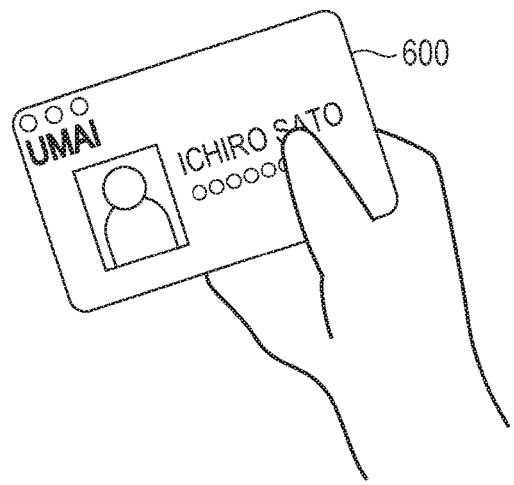

ATTENDANCE REGISTRATION

IZAKAYA UMAI

10 OCTOBER 2017 (TUESDAY)

16:00

IZAKAYA UMAI
3847: ICHIRO SATO

CHECK-IN TIME HAS BEEN RECORDED

| CHECK-IN | CHECK-OUT | BREAK START | BREAK END |

540

| SELECT BY NUMBER | SELECT BY NAME |

INPUT OF EMPLOYEE NUMBER

| 1 | 2 | 3 |
| 4 | 5 | 6 |
| 7 | 8 | 9 |
| C | 0 | |

ATTENDANCE REGISTRATION

IZAKAYA
UMAI

10 OCTOBER 2017 (TUESDAY)

16:11

INPUT EMPLOYEE NUMBER

| CHECK-IN | CHECK-OUT | BREAK START | BREAK END |

| SELECT BY NUMBER | SELECT BY NAME |

INPUT OF EMPLOYEE NUMBER

3

| 1 | 2 | 3 |
| 4 | 5 | 6 |
| 7 | 8 | 9 |
| C | 0 | |

ATTENDANCE REGISTRATION

IZAKAYA UMAI

10 OCTOBER 2017 (TUESDAY)

16:11

IZAKAYA UMAI
3864: HANAKO TANAKA

SELECT ATTENDANCE TYPE

| CHECK-IN | CHECK-OUT | BREAK START | BREAK END |

| SELECT BY NUMBER | SELECT BY NAME |

INPUT OF EMPLOYEE NUMBER

3864

| 1 | 2 | 3 |
| 4 | 5 | 6 |
| 7 | 8 | 9 |
| C | 0 | |

ATTENDANCE REGISTRATION

IZAKAYA UMAI

10 OCTOBER 2017 (TUESDAY)

16:11

IZAKAYA UMAI
3864: HANAKO TANAKA

CHECK-IN TIME HAS BEEN RECORDED

| SELECT BY NUMBER | SELECT BY NAME |

INPUT OF EMPLOYEE NUMBER

3864

| 1 | 2 | 3 |
| 4 | 5 | 6 |
| 7 | 8 | 9 |
| C | 0 | |

OK

CHECK-IN   CHECK-OUT   BREAK START   BREAK END 423
540
551

FIG. 18

ATTENDANCE REGISTRATION

IZAKAYA UMAI — 431

10 OCTOBER 2017 (TUESDAY)

16:11

IZAKAYA UMAI
3864: HANAKO TANAKA

SELECT ATTENDANCE TYPE

[CHECK-IN] [CHECK-OUT] [BREAK START] [BREAK END]

540

570

| SELECT BY NUMBER | SELECT BY NAME |
|---|---|
| MANAGER | |
| 3847: | ICHIRO SATO |
| 3792: | JIRO SUZUKI |
| STAFF | |
| 3887: | SABURO ABE |
| 3864: | HANAKO TANAKA |
| 4004: | TSUKIKO KOIKE |

| SELECT BY NUMBER | SELECT BY NAME |
|---|---|
| MANAGER | |
| 3847: ICHIRO SATO | |
| 3792: JIRO SUZUKI | |
| STAFF | |
| 3887: SABURO ABE | |
| 3864: HANAKO TANAKA | |
| 4004: TSUKIKO KOIKE | |

ATTENDANCE REGISTRATION

IZAKAYA UMAI

10 OCTOBER 2017 (TUESDAY)

16:11

IZAKAYA UMAI
3864: HANAKO TANAKA

CHECK-IN TIME HAS BEEN RECORDED

[CHECK-IN] [CHECK-OUT] [BREAK START] [BREAK END]

FIG. 20

ATTENDANCE REGISTRATION

IZAKAYA UMAI

10 OCTOBER 2017 (TUESDAY)

16:00

IZAKAYA UMAI
3847: ICHIRO SATO

CHECK-IN TIME HAS BEEN RECORDED
CONSECUTIVELY REGISTERED,
ASK MANAGER

| CHECK-IN | CHECK-OUT | BREAK START | BREAK END |

| SELECT BY NUMBER | SELECT BY NAME |

INPUT OF EMPLOYEE NUMBER

| 1 | 2 | 3 |
| 4 | 5 | 6 |
| 7 | 8 | 9 |
| C | 0 | |

OK

441

540

ATTENDANCE REGISTRATION DEVICE, ATTENDANCE REGISTRATION METHOD, AND RECORDING MEDIUM

BACKGROUND

1. Technical Field

The present invention relates to an attendance registration device, an attendance registration method, and a recording medium for registration of attendance of an employee.

2. Related Art

An attendance registration device (time recorder) that is installed at an entrance of a work place and is capable of registering time (recording time) of entering or leaving or the office has been known. When attendance registration is performed using the attendance registration device, an employee selects an attendance type such as check-in and check-out, and the attendance registration device performs near field communication with an IC card of the employee, and executes the attendance registration by registering a time and the attendance type when identification information (employee identification information) of the employee has been confirmed (for example, JP 2016-57661 A).

A customer engineer at a cash register agent maintains a plurality of kinds of electronic cash registers at plural stores. When the customer engineer restores backup of cash register setting data in a smartphone to the electronic cash register, there is a risk of mistaking backup data to be transmitted.

In the attendance registration using the IC card (a near field communication tag), however, it is possible to mitigate the labor of the employee who performs the attendance registration, but there is a problem that no attendance registration can be performed when the IC card is lost. In the attendance registration device, it is desirable to perform not only the attendance registration using the near field communication but also attendance registration in which an employee manually inputs employee identification information such as an employee number using operation keys.

Meanwhile, the manual attendance registration needs to have an operational device so as to prevent attendance registration of others caused by erroneous input of employee identification information.

SUMMARY

An attendance registration device of an aspect of the present invention is an attendance registration device including a processor that executes:

a reception process of receiving input according to a first method or input according to a second method of identification information corresponding to a target person whose attendance needs to be registered; and a registration process of registering attendance by associating the identification information received in the reception process with an attendance type input at a predetermined timing, wherein in the registration process, an attendance type input prior to the input of the identification information is subjected to attendance registration in association with the identification information when an input method of the identification information whose input has been received in the reception process is the first method, and an attendance type input after the input of the identification information is subjected to attendance registration in association with the identification information when the input method of the identification information whose input has been received in the reception process is the second method.

BRIEF DESCRIPTION OF THE DRAWINGS

FIG. 3 is a table illustrating a data configuration of an employee information database according to the present embodiment;

FIG. 4 is a table illustrating a data configuration of the attendance history database according to the present embodiment;

FIG. 10 is a view illustrating an attendance registration screen at the time of error display when registering attendance whose attendance type is not selected according to the present embodiment;

FIG. 12 is a view illustrating a state before the employee touches the attendance registration device with the IC card according to the present embodiment;

FIG. 14 is a view illustrating an attendance registration screen when completing the attendance registration according to the present embodiment;

FIG. 15 is a view illustrating an attendance registration screen when starting input of an employee number according to the present embodiment;

FIG. 16 is a view illustrating an attendance registration screen when completing the input of the employee number according to the present embodiment;

FIG. 17 is a view illustrating an attendance registration screen when completing attendance registration based on the employee number according to the present embodiment;

FIG. 18 is a view illustrating an attendance registration screen when selecting a name according to the present embodiment;

FIG. 19 is a view illustrating an attendance registration screen when completing attendance registration based on the name according to the present embodiment; and FIG. 20 is a warning display screen at the time of attendance registration of consecutive same attendance types according to the present embodiment.

DETAILED DESCRIPTION

<<Overall Configuration of Attendance Registration System>>

Figure 1:
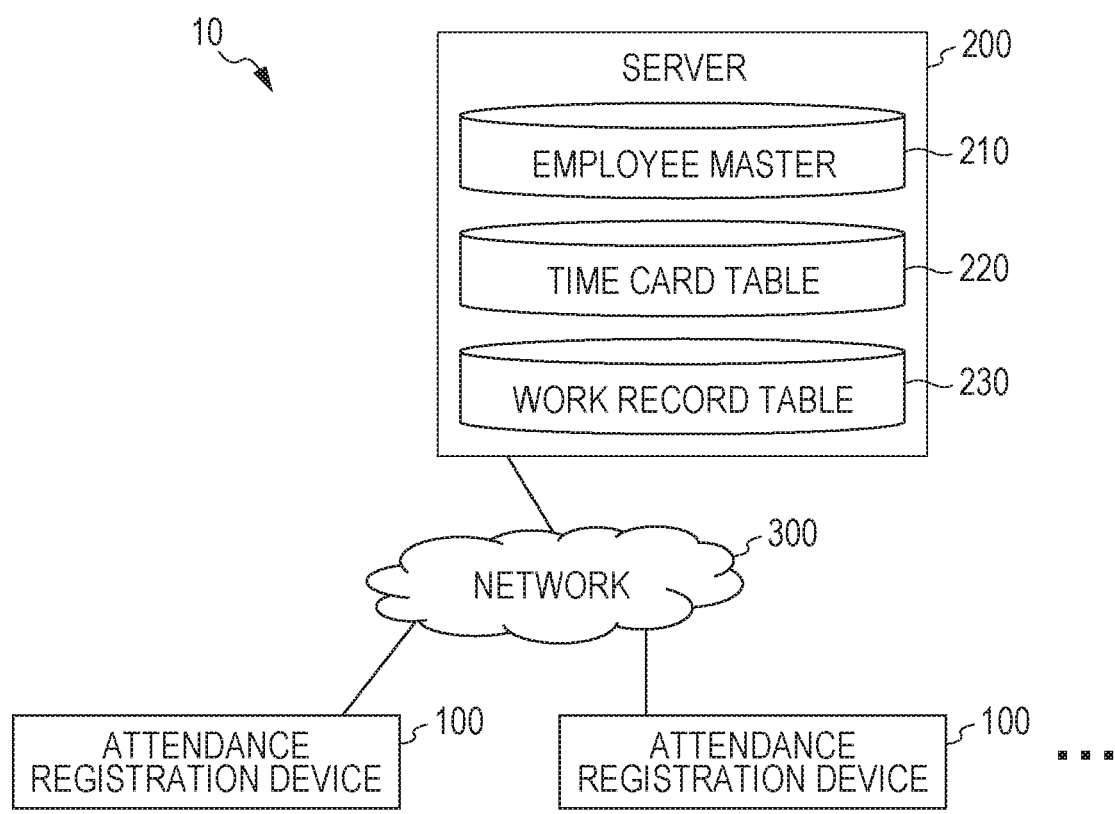
FIG. 1 is a diagram illustrating an overall configuration of an attendance registration system according to the present embodiment.

Hereinafter, modes for carrying out the present invention (embodiments) will be described with reference to the drawings. FIG. 1 is a diagram illustrating the overall configuration of an attendance registration system 10 according to the present embodiment as an attendance registration system. The attendance registration system 10 is configured to include an attendance registration device 100 and a server 200 which are connected via a network 300. There is also a case where a plurality of attendance registration devices 100 is installed for each branch office or shop.

<<Overall Configuration of Server>>

The server 200 stores an employee master 210, a time card table 220, and a work record table 230. The employee master 210 is a database configured to manage information on employees, and stores information including an employee number and a name of each employee and identification information of an IC card owned by the employee (IC card identification information). The time card table 220 is a database configured to manage information that has been target subjected to attendance registration by the attendance registration device 100, and stores information including an employee number, an attendance date, an attendance time, and an attendance type indicating an attendance operation such as check-in and check-out.

The work record table 230 is a table configured to manage a work record generated based on attendance registration information stored in the time card table 220. Here, the generated work record is generated as information in the form that is easy to utilize for a predetermined application based on the attendance registration information stored in the time card table 220, and may directly adopt the attendance registration information. However, the time card table 220 includes the attendance registration information itself registered by the attendance registration device 100, and thus, check-out registration is redundantly stored, for example, when an employee mistakenly registers check-outs in a consecutive manner. It is preferable that the work record table 230 store a work record derived in consideration of such a case as well.

<<Overall Configuration of Attendance Registration Device>>

Figure 2:
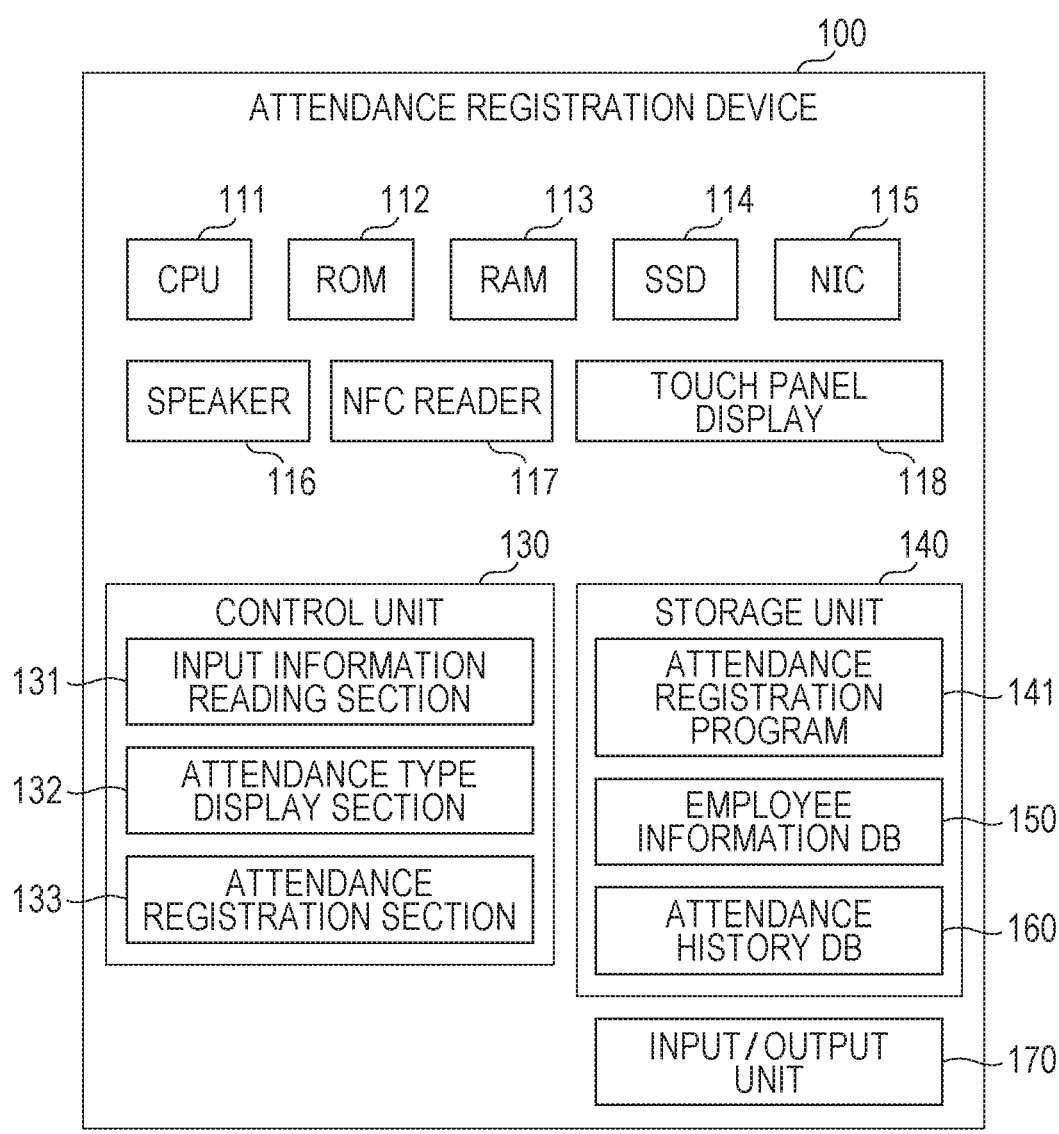
FIG. 2 is a diagram illustrating an overall configuration of an attendance registration device according to the present embodiment.

FIG. 2 is a diagram illustrating an overall configuration of the attendance registration device 100 according to the present embodiment. As the hardware, the attendance registration device 100 is a tablet terminal, and is configured to include a central processing unit (CPU) 111, a read only memory (ROM) 112, a random access memory (RAM) 113, an solid state drive (SSD) 114, a network interface card (NIC) 115, a speaker 116, an near field communication (NFC) reader (IC card reader) 117, and a touch panel display (display unit) 118. The NFC reader 117 is not necessarily built in the attendance registration device 100 but may be externally attached.

In addition, the attendance registration device 100 is logically constituted by a control unit 130, a storage unit 140, and an input/output unit 170. The control unit 130 is configured using the CPU 111 and causes the entire attendance registration device 100 to function. The storage unit 140 includes the ROM 112, the RAM 113, and the SSD 114, and stores various databases and programs. The input/output unit 170 includes the NIC 115 that transmits and receives communication data with the server 200, the speaker 116 that generates a warning sound when an employee erroneously operates the device, the NFC reader 117 that reads the IC card identification information, and the touch panel display 118 that displays an attendance type button and a name of an employee and reads a user's operation.

The control unit 130 executes an attendance registration process to be described later by executing an operating system (OS) (not illustrated) and an attendance registration program 141 stored in the storage unit 140. The control unit 130 is configured to include an input information reading section (reception section) 131, an attendance type display section (display control section) 132, and an attendance registration section (registration section) 133.

The input information reading section (reception section) 131 reads the IC card identification information from the NFC reader 117 forming the input/output unit 170 and reads employee identification information (identification information corresponding to a target person whose attendance needs to be registered) such as an attendance type, such as check-in and check-out, employee's number and name, and the like that has been input by an employee operating the touch panel display 118. Incidentally, the input information reading section 131 refers to an employee information database 150 (described as Employee Information DB (Database) in FIG. 2, see FIG. 3) to be described later to convert the read IC card identification information and name into the employee number. Thus, the IC card identification information is one type of the employee identification information (identification information corresponding to the target person whose attendance needs to be registered).

FIG. 3 is a table illustrating a data configuration of the employee information database 150 according to the present embodiment. The employee information database 150 is a tabular database stored in the storage unit 140, has each row (record) indicating information of one employee, and includes an employee number 151, a name 152, IC card identification information (described as IC Card ID in FIG. 3) 153, and an attribute (column) of a position 154.

The employee number 151 is an employee number of an employee and is one type of the employee identification information. The employee can input the employee number from the touch panel display 118 (input according to a second method).

The name 152 is a name of an employee and is one type of the employee identification information. The employee can input the name 152 by selecting and tapping his/her name 152 (see FIG. 18 to be described later) displayed on the touch panel display 118 (input according to the second method).

The IC card identification information 153 is identification information of an IC card owned by an employee and is one type of employee identification information. The employee can input the IC card identification information 153 by covering (touching) the NFC reader 117 with his/her IC card (input according to a first method). When an employee has no possessed (registered) IC card, the IC card identification information 153 is "-".

The position 154 is a position of an employee.

The record 159 indicates that an employee corresponding to an employee number "3864" has a name "Hanako Tanaka", has no possessed (registered) IC card, and has a position "staff".

The employee master 210 stored by the server 200 is data serving as a master of the employee information database 150 stored by the attendance registration device 100. The attendance registration device 100 downloads information on an employee working at a branch or a shop where the attendance registration device 100 is installed and performing attendance registration from the employee master 210 of the server 200, and stores the downloaded information in the employee information database 150.

Returning to FIG. 2, the attendance type display section (display section) 132 controls display of the buttons of the attendance types (see FIG. 8 to be described later) including the check-in, the check-out, and the like on the touch panel display 118. When the input information reading section 131 reads that the attendance type button has been tapped (selected), the attendance type display section 132 displays the tapped attendance type button (see a check-in button 551 illustrated in FIG. 9 to be described later) in a highlighted manner, thereby performing display that enables an employee to easily understand a state where the corresponding attendance type has been selected.

The attendance registration section (registration section) 133 stores an employee number corresponding to employee identification information read by the input information reading section 131 (identification information corresponding to a target whose attendance needs to be registered), an attendance date, an attendance time, and the selected attendance type in an attendance history database 160 (described as the attendance history DB in FIG. 2, see FIG. 4) to be described later. More specifically, when an employee touches the NFC reader 117 with an IC card and the input information reading section 131 reads IC card identification information in the state where the attendance type has been selected, the attendance registration section 133 stores an employee number, a date and time, and the attendance type corresponding to the IC card identification information in the attendance history database 160.

Further, in a case where an employee inputs an employee number or name, the attendance type display section 132 displays a state where any attendance type is not selected when the input information reading section 131 starts reading the employee number or name. Subsequently, when the input information reading section 131 reads an attendance type selected by the employee after reading the employee number or name, the attendance registration section 133 stores the employee number, a date and time, and the attendance type in the attendance history database 160. When a name is input, the input information reading section 131 converts the name into an employee number, and the attendance registration section stores the employee number, a date and time, and the attendance type in the attendance history database 160.

FIG. 4 is a table illustrating a data configuration of the attendance history database 160 according to the present embodiment. The attendance history database 160 is a database in the form of a table stored in the storage unit 140, has each row (record) indicating one piece of information on attendance registration, and includes an employee number 161, an attendance date 162, an attendance time 163, an attendance type 164, and an attribute (column) of server registration 165.

The employee number 161 is an employee number of an employee whose attendance has been registered and corresponds to the employee number 151 in the employee information database 150. The attendance date 162 indicates a date when the attendance registration has been performed, the attendance time 163 indicates a time when the attendance registration has been performed, and the attendance type 164 indicates an attendance type for which attendance registration has been performed. The attendance type 164 includes "check-in", "check-out", "break start", and "break end". The server registration 165 indicates whether information on attendance registration included in a record has been registered in the server 200, and indicates "Y" in the registered state and "N" in the unregistered state. The information on the attendance registration registered in the server is stored in the time card table 220 (see FIG. 1).

A record 169 indicates that an employee whose employee number is "3847" has registered "check-in" at 16:00:54 on Oct. 10, 2017 and indicates that the record is not registered in the server 200.

<<Attendance Registration Process>>

Figure 5:
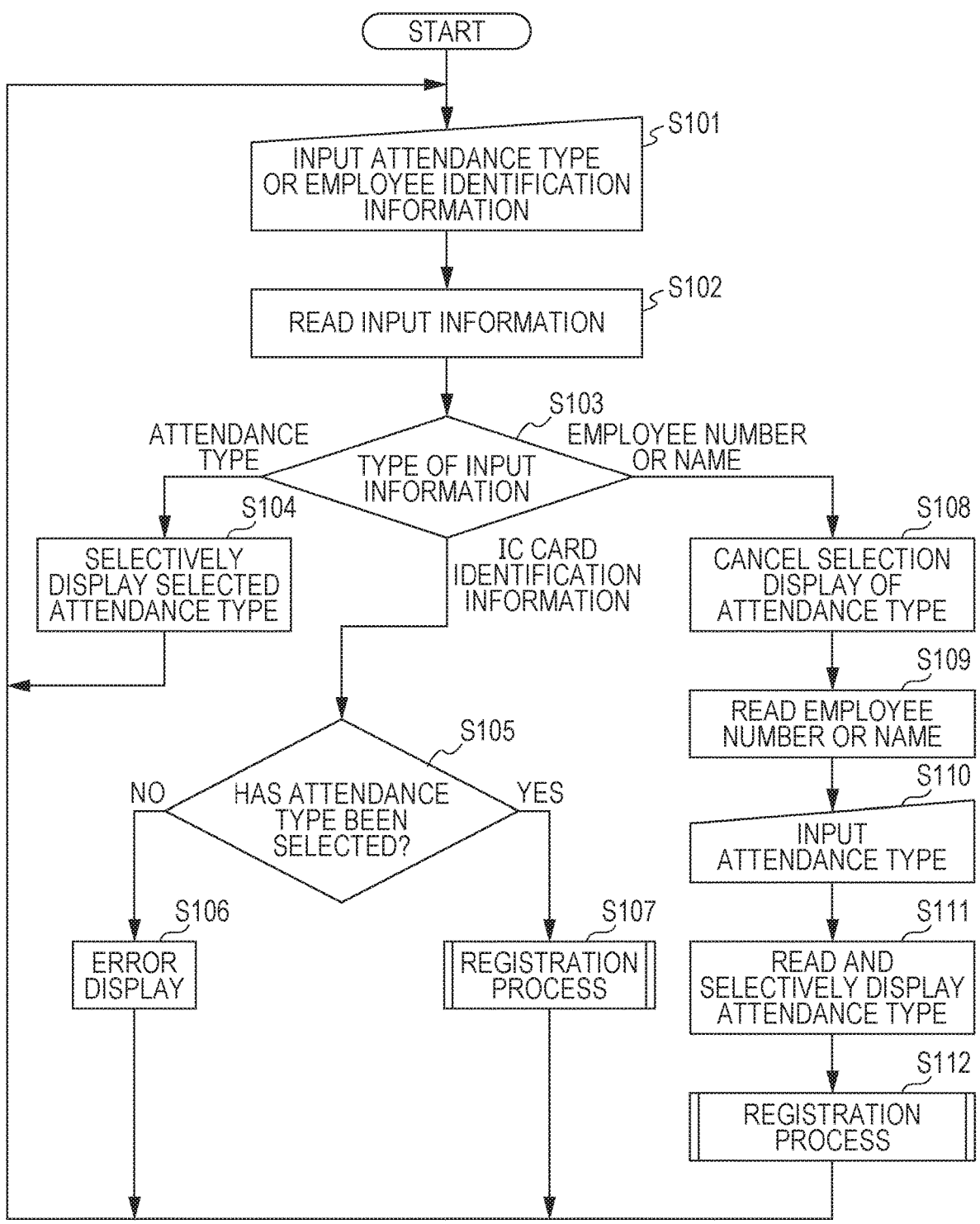
FIG. 5 is a flowchart illustrating flow of an attendance registration process according to the present embodiment.

FIG. 5 is a flowchart illustrating flow of the attendance registration process according to the present embodiment. Hereinafter, the attendance registration process executed by the attendance registration device 100 will be described with reference to FIG. 5 and the display screen on the touch panel display 118 and the like (FIGS. 8 to 20).

Figure 8:
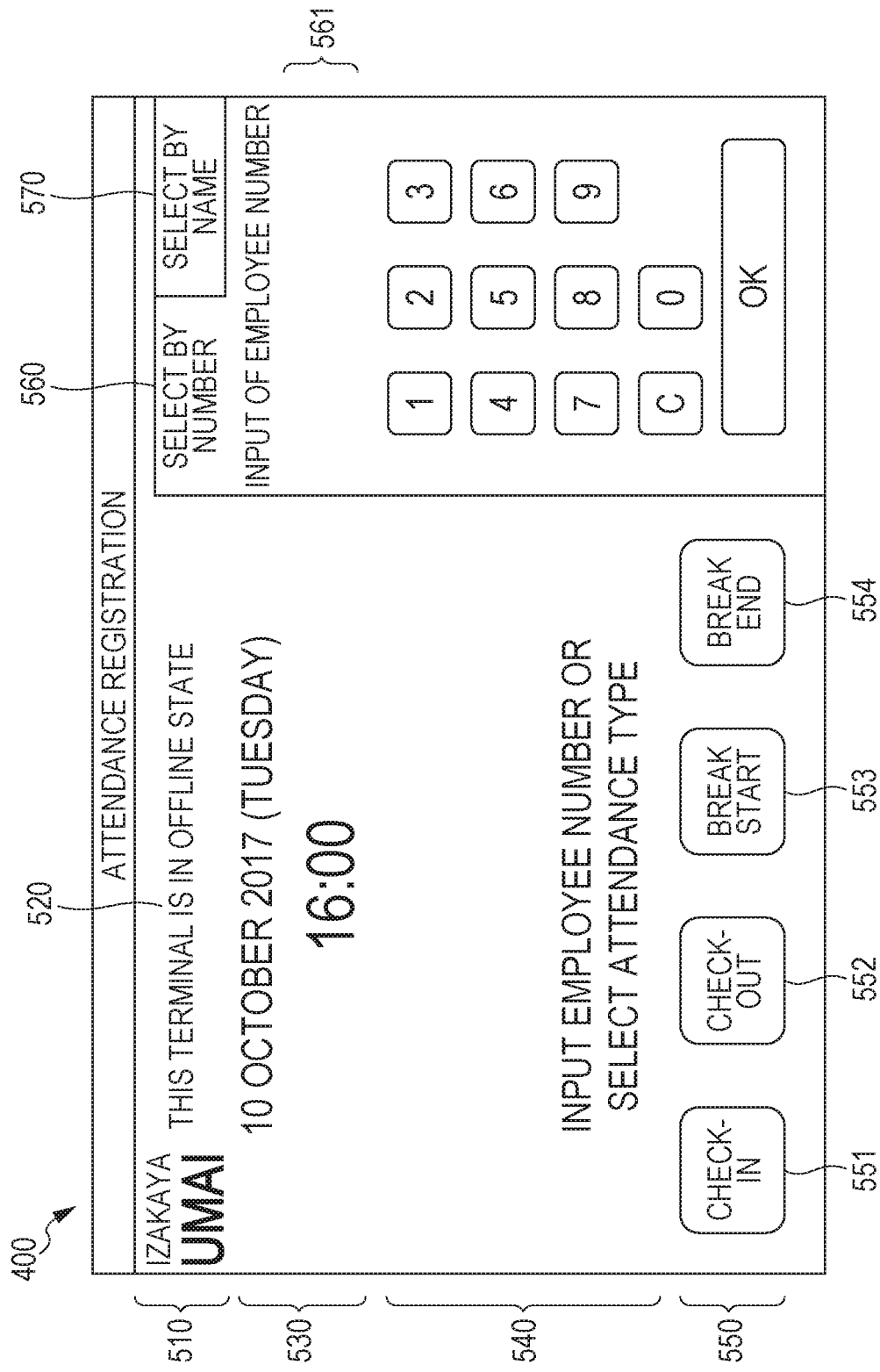
FIG. 8 is a view illustrating an attendance registration screen immediately after starting the attendance registration process according to the present embodiment.

FIG. 8 is a view illustrating an attendance registration screen immediately after starting the attendance registration process according to the present embodiment. A logo of an organization that has introduced the attendance registration system 10 or a manufacturer of the attendance registration device 100 is displayed in a logo area 510 of a screen 400. For example, when connection is in an offline state in the attendance registration device 100, information for providing notification of such a state is displayed in a notification area 520. In a date and time area 530, current date and time is displayed. In a message area 540, an employee number and a name of an employee corresponding to employee identification information read by the attendance registration device 100, a registered attendance type, a message urging the employee for the next operation, a warning message, and the like are displayed.

In an attendance/registration area 550, buttons indicating attendance types (attendance type buttons) including the check-in button 551, a check-out button 552, a break start button 553, and a break end button 554 are displayed. In the screen 400, no attendance type is selected, and no button is displayed in a selected state.

An employee selection area in which a "select by number" tab 560 and a "select by name" tab 570 are displayed is arranged on the right side of the screen 400. In the screen 400, the "select by number" tab 560 is selected and displayed, and a numeric keypad, a clear key (C key) and an OK key are displayed. Although an employee number area 561 is arranged in the "select by number" tab 560, but no employee number has been input so that nothing is displayed on the screen 400.

Returning to FIG. 5, an employee inputs an attendance type or employee identification information in step S101. When inputting the attendance type, the employee taps one of the attendance buttons displayed in the attendance/registration area 550. When inputting the employee identification information (IC card identification information) using the IC card (input according to the first method), the employee touches the NFC reader 117 with the IC card (see FIG. 13 to be described later). When inputting an employee number (input according to the second method), the employee selects the "select by number" tab 560, inputs the employee number using the numeric keypad, and taps the OK key when the input is completed. When inputting a name (input according to the second method), the employee selects the "select by name" tab 570 and taps the name from a displayed name list (see FIG. 18 described below).

In step S102, the input information reading section 131 reads the input information.

In step S103, the processing proceeds to step S104 in a case where a type of the input information read in step S102 is the attendance type (S103→attendance type), the processing proceeds to step S105 in a case where the type is the IC card identification information (S103→IC card identification information), and the processing proceeds to step S108 in a case where the type is an employee number or a name (S103→employee number or name) Here, the case where the type is the employee number or the name includes selection of the "select by number" tab 560 or the "select by name" tab 570 (tap of a title part of the tab) and input of a first key when the "select by number" tab 560 is displayed (tap of the numeric keypad).

Figure 9:
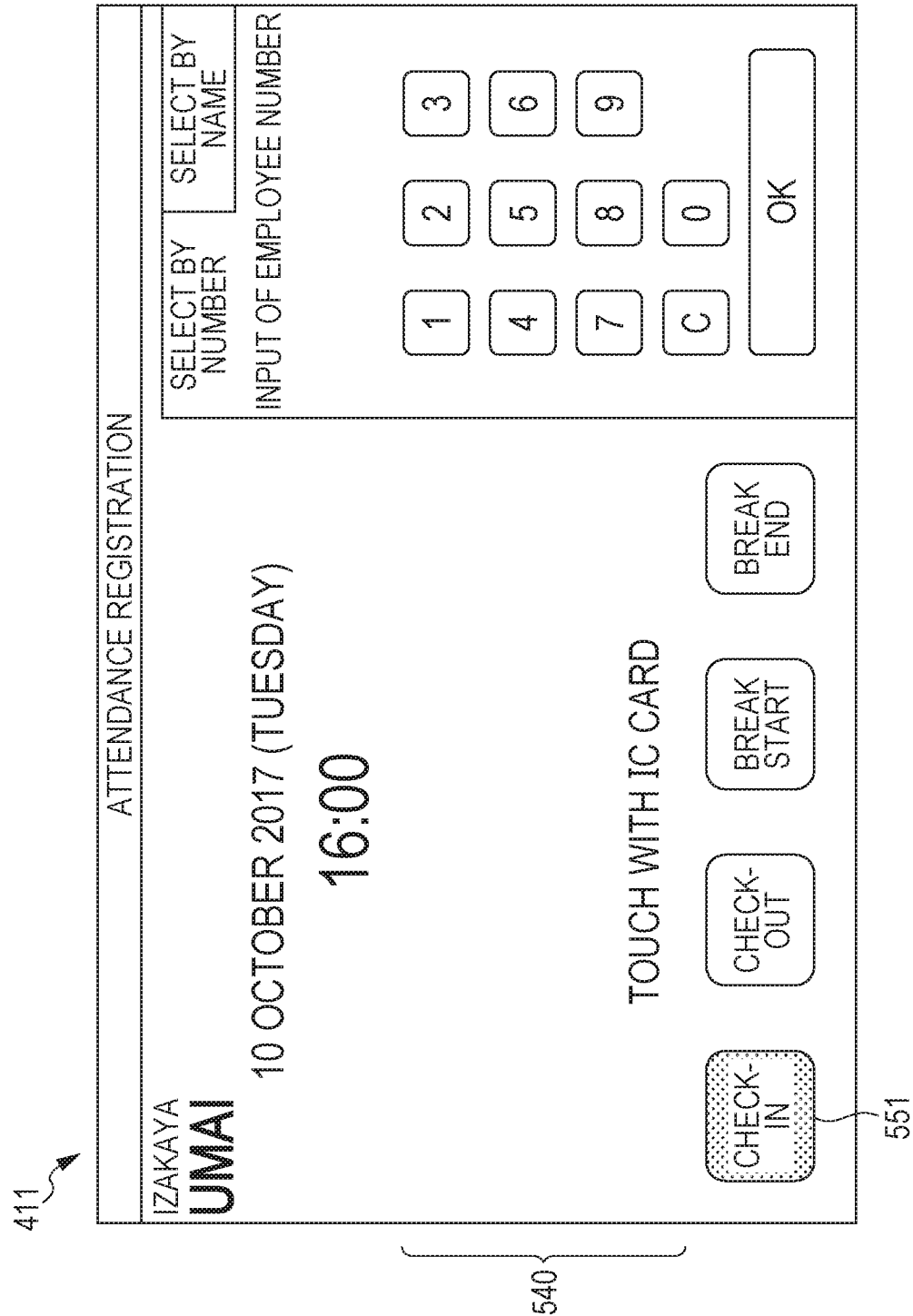
FIG. 9 is a view illustrating an attendance registration screen when selecting an attendance type according to the present embodiment.

In step S104, the attendance type display section 132 displays a state (selected state) where a button of the selected attendance type has been selected. FIG. 9 is a view illustrating an attendance registration screen when selecting an attendance type according to the present embodiment. On the screen 411, the check-in button 551 is tapped and the check-in button 551 is displayed in the selected state. In the message area 540, a message for prompting touch with the IC card is displayed as the next operation for the employee.

In step S105, the processing proceeds to step S106 when it is a state where none of the attendance types has been selected (S105→N), and the processing proceeds to step S107 when it is a state where any one of the attendance types has been selected (S105→Y).

In step S106, the attendance registration section 133 displays an error message indicating that an employee has tried to perform attendance registration using an IC card without selecting an attendance type in a noticeable color such as red or orange, and outputs a warning sound from the speaker 116. FIG. 10 is a view illustrating an attendance registration screen at the time of error display when registering attendance whose attendance type is not selected according to the present embodiment. On the screen 412, a message "select attendance type to be registered and touch with IC card" is displayed in the message area 540.

A description will be given regarding an IC card and a manner in which an employee performs attendance registration using the IC card before describing the registration process in step S107.

Figure 11:
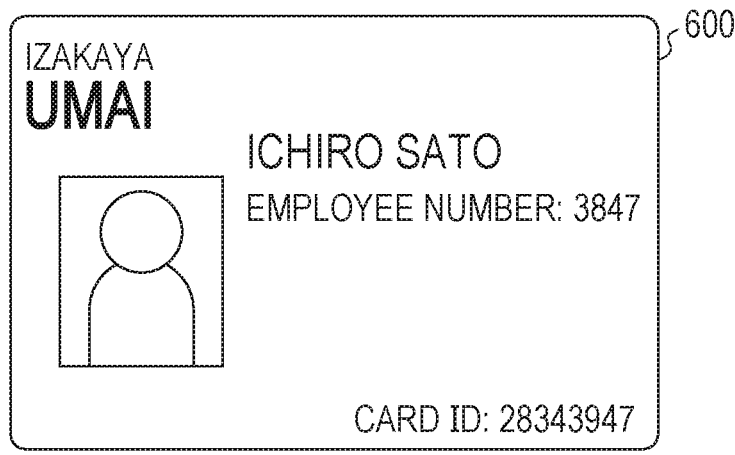
FIG. 11 is a view illustrating an example of an appearance of an IC card owned by an employee according to the present embodiment.

FIG. 11 is a view illustrating an example of an appearance of an IC card 600 owned by an employee according to the present embodiment. A logo of an organization that has introduced the attendance registration system 10, displayed in the logo area 510 (see FIG. 8), a photo, a name, and an employee number of an employee, and IC card identification information are printed on the IC card 600. The IC card 600 is a card issued from the organization that has introduced the attendance registration system 10, but is not necessarily an IC card dedicated to such attendance registration, and may be a traffic IC card such as SUICA (registered trademark), KITACA (registered trademark), ICOCA (registered trademark), TOICA (registered trademark), and PASMO (registered trademark) or an electronic money card.

FIG. 12 is a view illustrating a state before the employee touches the attendance registration device 100 with the IC card 600 according to the present embodiment. A screen 411 (see FIG. 9) is displayed on the touch panel display 118 of the attendance registration device 100, and the check-in button 551 is in the selected state.

Figure 13:
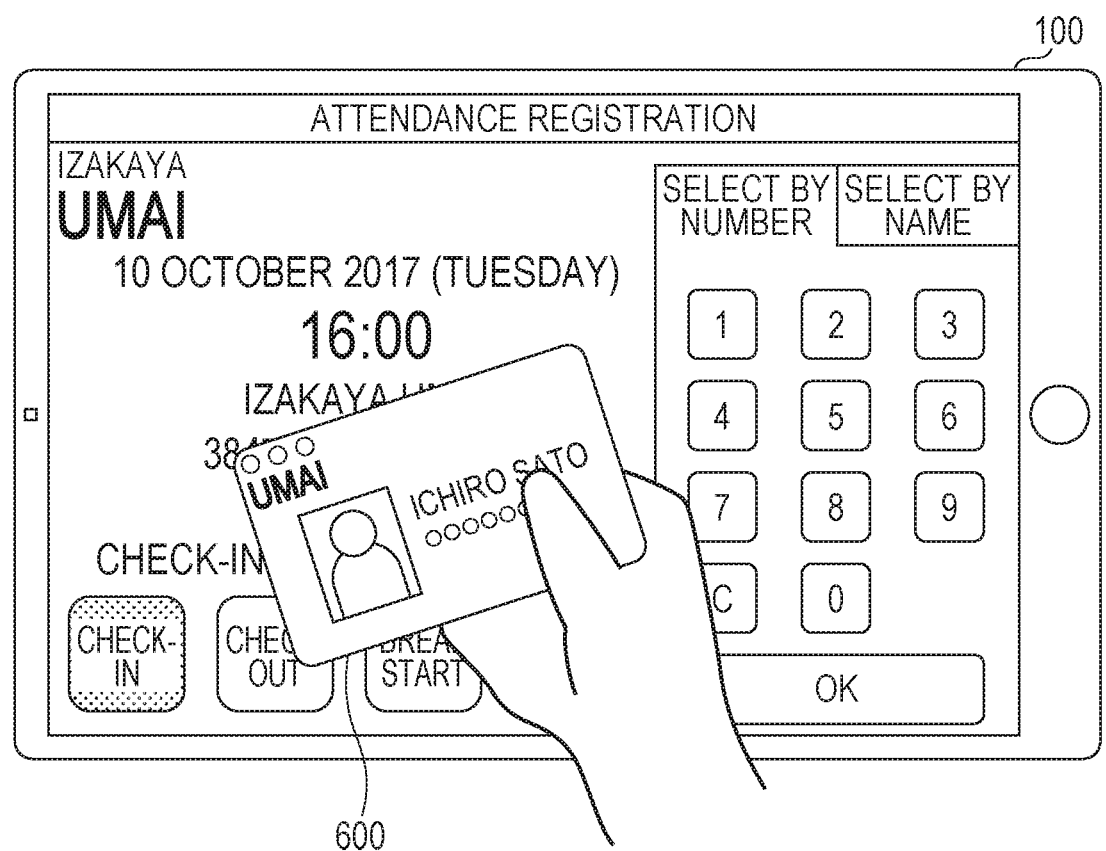
FIG. 13 is a view illustrating a state after the employee touches the attendance registration device with the IC card according to the present embodiment.

FIG. 13 is a view illustrating a state after the employee touches the attendance registration device 100 with the IC card 600 according to the present embodiment. A screen 413 (see FIG. 14 to be described later) is displayed on the touch panel display 118 of the attendance registration device 100. When the attendance registration device 100 is touched with the IC card 600, the check-in is registered as will be described later in step S107.

In step S107, the attendance registration section 133 performs the registration process. Details of the registration process including registration to the server 200 will be described later with reference to FIG. 6. When the attendance registration section 133 executes the registration process, a message indicating that the attendance registration has been performed is displayed. FIG. 14 is a view illustrating an attendance registration screen when completing the attendance registration according to the present embodiment. On the screen 413, a message of completion of attendance registration including an employee number, a name, and an attendance type is displayed in the message area 540. Here, the employee number is the employee number 151 converted from the read IC card identification information 153 with reference to the employee information database 150 (see FIG. 3) by the input information reading section 131. The name is the name 152 corresponding to the employee number 151 obtained with reference to the employee information database 150 by the attendance registration section 133. The attendance type is the attendance type in the selected state. Although the attendance type is the check-in in this example, the same process is also applied to other attendance types such as check-out and the break state.

In step S108, the attendance type display section 132 displays all the attendance type buttons in the unselected state. FIG. 15 is a view illustrating an attendance registration screen when starting input of an employee number according to the present embodiment. The screen 421 is a screen at a time when the "select by number" tab 560 is selected and an employee taps a numeric key of "3" which is the first number of the employee number, "3" is displayed in the employee number area 561, and none of the attendance type buttons is displayed in the unselected state. When an employee taps a numeric key on a screen where any of the attendance types has been selected, such as the screen 411 (see FIG. 9) and the screen 413 (see FIG. 14), the screen shifts to the screen 421.

In step S109, the input information reading section 131 reads an employee number or a name input by the employee. In step S103, the processing branches to step S108 depending on selection of the "select by number" tab 560 or the "select by name" tab 570, and reading of the first key of the "select by number" tab 560. For this reason, when the processing proceeds to step S108, the input information reading section 131 does not read the employee number or the name, and the reading of the employee number or the name is completed in step S109. Hereinafter, a description will be given regarding a case where an employee number has been input using the numeric keypad and the OK button has been tapped on the "select by number" tab 560. A case of using the "select by name" tab 570 will be described separately.

FIG. 16 is a view illustrating an attendance registration screen when completing the input of the employee number according to the present embodiment. On the screen 422, the input employee number is displayed in the employee number area 561, and the input employee number and a name corresponding to the employee number are displayed in the message area 540. Here, the employee number is the employee number read by the input information reading section 131, and the name is the name 152 that corresponds to the employee number 151 obtained by referring to the employee information database 150 by the attendance registration section 133. When the input employee number has been read in this manner, the name 152 of the corresponding employee is displayed in the message area 540. Accordingly, for example, even if an employee number corresponding to another employee is mistakenly input, the name 152 of the other employee is displayed in the message area 540 so that it is possible to make the user to notice the erroneous input of the employee number at this stage.

At this stage, since the attendance type is not selected, a message prompting the employee to select the attendance type is displayed in the message area 540.

In step S110, the employee taps the attendance type button to input the attendance type. Here, the description will continue assuming that the check-in button 551 has been tapped.

In step S111, the input information reading section 131 reads out the attendance type input by the employee in step S110, and the attendance type display section 132 displays the button of the attendance type in the selected state. Here, the check-in button 551 is displayed in the selected state.

In step S112, the attendance registration section 133 performs the registration process. Details of the registration process including registration to the server 200 will be described later with reference to FIG. 6. When the registration process is executed, a message indicating that the attendance registration has been performed is displayed. FIG. 17 is a view illustrating an attendance registration screen when completing attendance registration based on the employee number according to the present embodiment. On the screen 423, a message of completion of attendance registration including an employee number, a name, and an attendance type is displayed in the message area 540. Here, the attendance type is the attendance type input in step S110 and read in step S111.

In the description of step S109 and the subsequent steps, the case where the employee number has been input in the "select by number" tab 560 has been described. Hereinafter, the case of using the "select by name" tab 570 will be described. FIG. 18 is a view illustrating an attendance registration screen when selecting a name according to the present embodiment. When the "select by name" tab 570 is tapped, no attendance type button is displayed on the screen 431 in the selected state as described in step S108. In addition, the employee number 151 and the name 152 included in the employee information database 150 are displayed in the employee name area 571, and a message for prompting selection of the employee number, the name, and the attendance type is displayed in the message area 540.

When the employee taps the check-in button 551 in step S110, the input information reading section 131 reads such tap in step S111, and the attendance registration section 133 performs the attendance registration process in step S112. FIG. 19 is a view illustrating an attendance registration screen when completing attendance registration based on the name according to the present embodiment. Even on a screen 432, a message of completion of attendance registration including an employee number, a name, and an attendance type is displayed in the message area 540, which is similar to the screen 423 (see FIG. 17).

<<Registration Process>>

Figure 6:
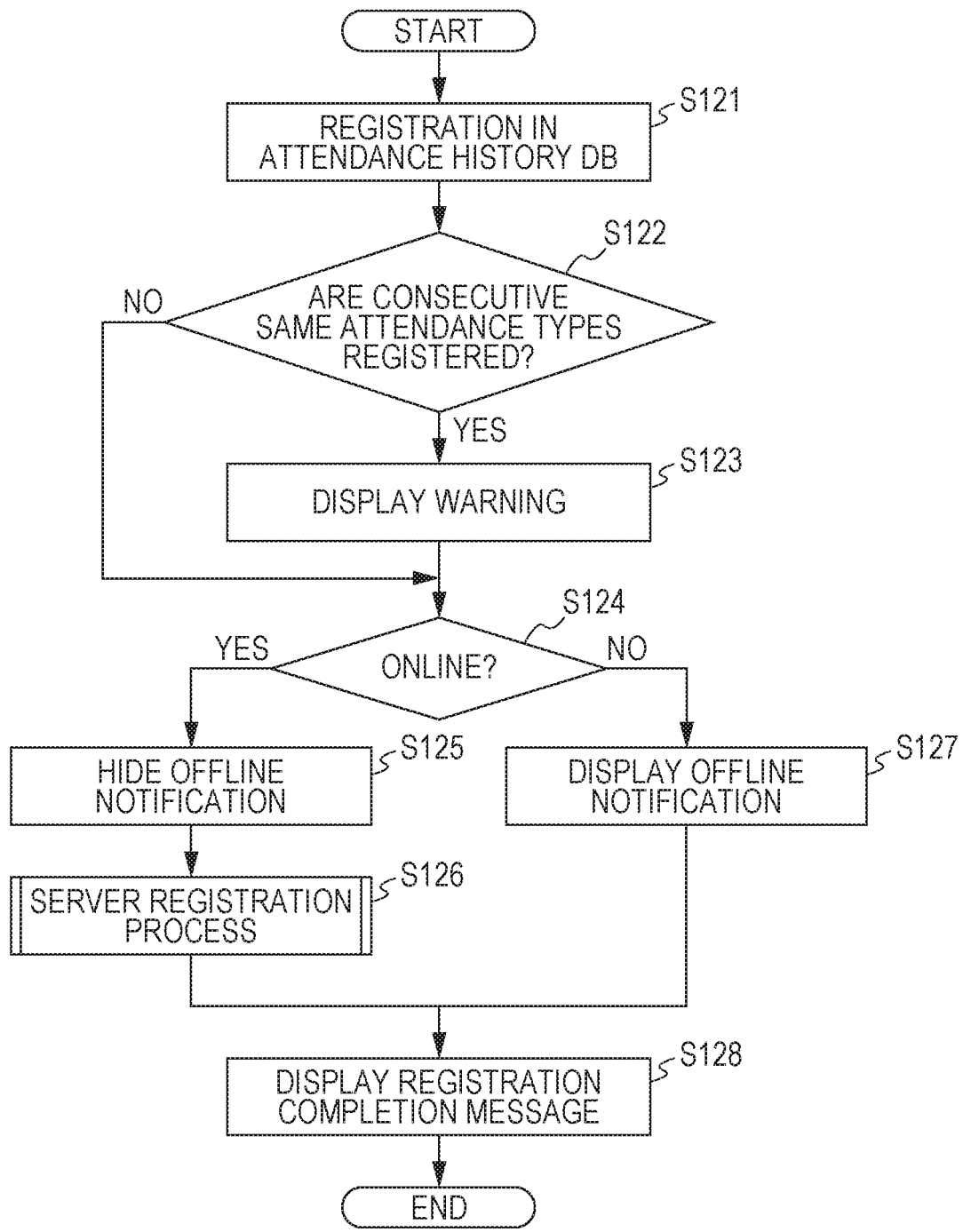
FIG. 6 is a flowchart illustrating flow of a registration process included in the attendance registration process according to the present embodiment.

Details of the registration process in steps S107 and S112 of the attendance registration process (see FIG. 5) will be described hereinafter. FIG. 6 is a flowchart illustrating flow of a registration process included in the attendance registration process according to the present embodiment.

In step S121, the attendance registration section 133 registers attendance information to the attendance history database 160 (see FIG. 4). Specifically, the attendance registration section 133 adds a record to the attendance history database 160 and stores the attendance information in the employee number 161, the attendance date 162, the attendance time 163, the attendance type 164, and the server registration 165. An employee number corresponding to input employee identification information is stored in the employee number 161, an employee number corresponding to IC card identification information, an employee number input by the "select by number" tab 560, or an employee number corresponding to z name input by the "select by name" tab 570 is stored. A date and time at the time of registration are stored in the attendance date 162 and the attendance time 163. When the IC card is used, an attendance type in the selected state before reading of the IC card identification information is stored as the attendance type 164. When an employee number or a name is input, an attendance type selected after the input is stored as the attendance type 164. "N" is stored in the server registration 165.

In step S122, the attendance registration section 133 determines whether the same attendance types have been consecutively registered. More specifically, the attendance registration section 133 searches a record of the attendance history database 160, the record having the same employee number 161 as the employee number 161 stored in step S121 and being the latest except for the record added in step S121. Subsequently, the attendance registration section 133 determines whether the attendance type 164 of the record of the search result is the same as the attendance type 164 stored in step S121. The attendance registration section 133 proceeds to step S123 when the same attendance types have been consecutively registered (S122→Y), and the processing proceeds to step S124 when it is not the consecutive registration of the same attendance types (S122→N).

In step S123, the attendance registration section 133 displays a message indicating the consecutive registration of the same attendance types with a conspicuous color such as red and orange, and outputs a warning sound from the speaker 116. FIG. 20 is a warning display screen at the time of attendance registration of consecutive same attendance types according to the present embodiment. A warning message "consecutively registered" is displayed in the message area 540 of a screen 441.

In step S124, the attendance registration section 133 determines whether the attendance registration device 100 and the server 200 are connected and in an online state (communication-enabled state). The processing proceeds to step S125 in the online state (S124→Y), the processing proceeds to step S127 in the offline state (S124→N).

In step S125, when a message indicating the offline state is displayed in the notification area 520, the attendance registration section 133 causes the message not to be displayed.

In step S126, the attendance registration section 133 executes a server registration process. Details of the server registration process will be described later with reference to FIG. 7.

In step S127, the attendance registration section 133 displays the message indicating the offline state in the notification area 520.

In step S128, the attendance registration section 133 displays the employee number, the name, and the attendance type registered in the attendance history database 160 in the message area 540 as a registration completion message in step S121. The screen 413 (see FIG. 14), the screen 423 (see FIG. 17), and the screen 432 (see FIG. 19) are examples of display of the registration completion message.

<<Server Registration Process>>

Figure 7:
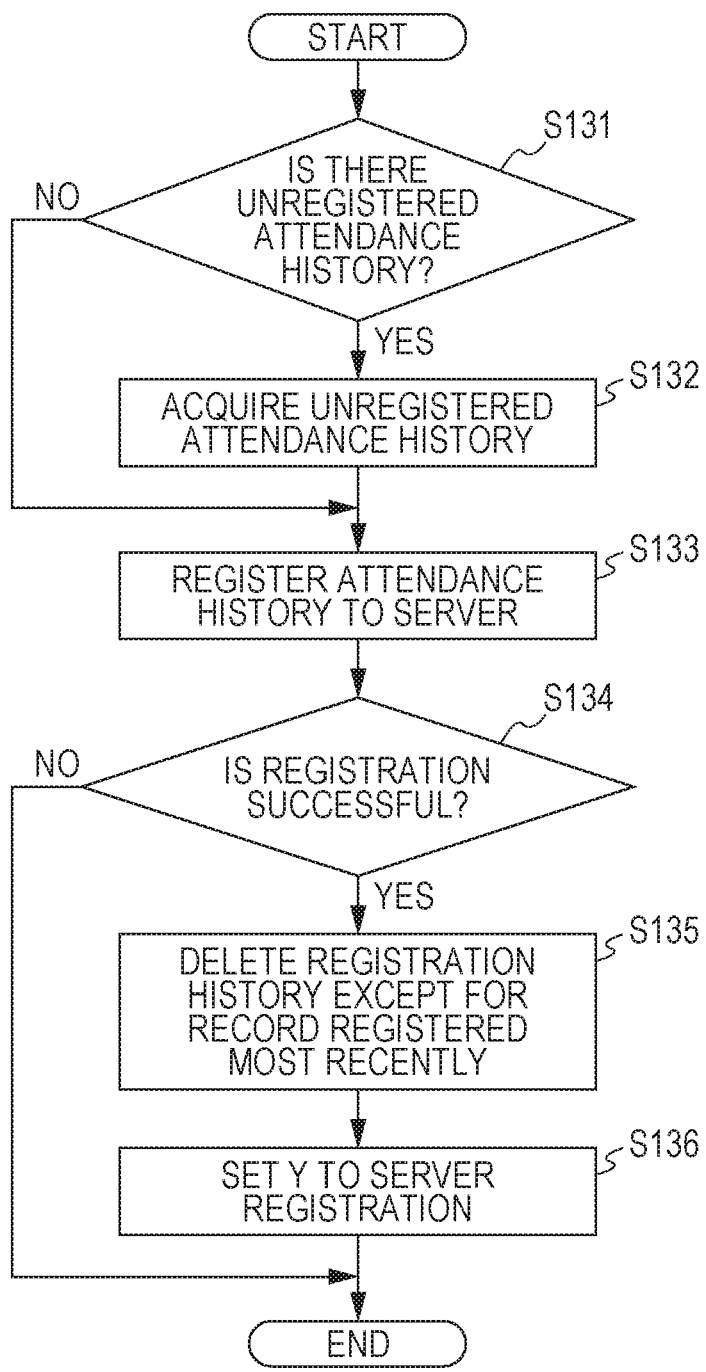
FIG. 7 is a flowchart illustrating flow of a server registration process included in the registration process according to the present embodiment.

Hereinafter, details of the server registration process in step S126 of the registration process (see FIG. 6) will be described. FIG. 7 is a flowchart illustrating flow of the server registration process included in the registration process according to the present embodiment.

In step S131, the attendance registration section 133 determines whether there is unregistered attendance history (attendance registration information). Specifically, the attendance registration section 133 determines whether there is a record of the attendance history database 160, the record having "N" in the server registration 165. The processing proceeds to step S132 when there is unregistered attendance history (S131→Y), and the processing proceeds to step S133 when there is no unregistered attendance history (S131→N).

In step S132, the attendance registration section 133 acquires the unregistered attendance history. Specifically, the attendance registration section 133 acquires a record of the attendance history database 160, the record having "N" in the server registration 165.

In step S133, the attendance registration section 133 transmits and registers the unregistered time-and-leave history to the server 200.

In step S134, the attendance registration section 133 determines whether the registration in step S133 is successful. The processing proceeds to step S135 when the registration is successful (S134→Y), and the server registration process is ended when the registration is failed (S134→N).

In step S135, the attendance registration section 133 deletes the attendance record excluding the latest registered record. Specifically, the attendance registration section 133 deletes the record of the attendance history database 160 from the attendance history database 160 except for the record registered most recently, for each of the employee numbers 161.

In step S136, the attendance registration section 133 sets the server registration 165 of the record in the attendance history database 160 to "Y".

<<Effects According to Attendance Registration Process>>

With the attendance registration process described above, an employee can perform attendance registration using any of the IC card, the employee number, and the name. Even if the employee forgets bringing the IC card, he/she can perform attendance registration using the employee number or the name.

In the case of using the IC card, the attendance type needs to be selected before touching with the IC card. In addition, when registering the same attendance type as that of a previous employee, the attendance type is already in the selected state, so that it is possible to perform attendance registration only by touching with the IC card. For example, in a check-in time zone in the morning, if an employee coming first to an office selects the check-in, employees coming afterwards can perform attendance registration consecutively by simply touching the device with the IC card.

When performing the attendance registration using the employee number or the name, the selected attendance type is registered after input of the employee number or the name Even if the attendance type has been selected before the input of the employee number or the name, the selection is canceled in step S108 (see FIG. 5) so that it is necessary to select the attendance type. Even if an employee inputs an employee number of another person or taps a name of another person by an erroneous operation, the employee selects the attendance type to perform attendance registration on the screen in which the employee number and the name are displayed in the message area 540 as illustrated in the screen 422 (see FIG. 16) and the screen 431 (see FIG. 18). As a result, the employee can notice the erroneous input of the employee number or the name before performing attendance registration, and it is possible to prevent erroneous attendance registration.

As described above, it is configured to select the attendance type after inputting the employee number or name in the case of performing attendance registration by inputting the employee number or the name (input according to the second method), and thus, it is possible to prevent erroneous registration of attendance of another person. On the other hand, when the employee identification information (IC card identification information) is input using the IC card to perform attendance registration (input according to the first method), the input is not erroneously performed different from the case of inputting the employee number or the name. Accordingly, since it is configured to select the attendance type before touching with the IC card, it is possible to perform attendance registration only by touching with the IC card if the same attendance type as that of the previous person is registered when the attendance registration is consecutively performed by a plurality of employees.

Modified Example

The present invention is not limited to the above embodiment, and it is possible to implement modifications within a range not deviating from a gist of the present invention, and examples of the modifications include the following (1) to (5).

(1) In the above embodiment, the attendance registration device 100 reads the IC card identification information of the IC card, and converts the read information into the employee number to perform attendance registration. Instead of the IC card identification information, the attendance registration device 100 may read the employee number stored in the IC card and perform attendance registration, or read identification information of an IC card owner stored in the IC card, and convert the read information into an employee number to perform attendance registration.

(2) A near field communication tag of another form such as a smartphone and a smart watch may be employed without being limited to the IC card. Further, biometric information of an employee such as a face, voice, a fingerprint, and a vein may be used. In this case, the attendance registration device 100 reads employee identification information as biometric information using a camera, a fingerprint sensor, or the like (input according to the first method) instead of the NFC reader 117, and collates the read information with registered biometric information stored in the employee information database 150 to convert the read biometric information into the employee number. The attendance registration device 100 may request the server 200 for the collation to acquire the employee number corresponding to the biometric information instead of holding the biometric information itself to perform the collation.

(3) The attendance type in the above embodiment is the check-in, the check-out, the break start, and the break end. Other attendance types such as outgo, reentry, being directly on outside duty, and direct return from outside duty may be included.

(4) In addition to the employee number and the name, a photo or a nickname of an employee may be used as employee identification information manually input by the employee from the attendance registration device 100 (input according to the second method). In addition, a password or the like may be input in addition to the input of employee identification information so as to authenticate an employee.

(5) In the above embodiment, the employee information is stored in the employee information database 150, and the attendance registration device 100 refers to the employee information database 150 when reading the employee identification information. Meanwhile, the attendance registration device 100 may inquire the server 200 without storing the IC card identification information in the employee information database 150. For example, when the IC card identification information is read, the attendance registration device 100 may inquire the server 200 to convert the read information into the employee number.

What is claimed is:

1. An attendance registration device comprising:
    a first input device configured to receive an input, by a first input method, of identification information of a target person whose attendance is to be registered;
    a second input device which is different from the first input device and is configured to receive an input, by a second input method which is different from the first input method, of the identification information of the target person whose attendance is to be registered; and
    a processor that executes:
    a reception process including receiving the input of the identification information a of the target person by the first input method through the first input device or by the second input method through the second input device, and determining which one of the first input method or the second input method has been used to perform the input of the identification information; and
    a registration process comprising registering attendance of the target person by associating the identification information received in the reception process with an attendance type input at a predetermined timing, the predetermined timing being different for the first input method than for the second input method,
    wherein the predetermined timing for the first input method is prior to the input of the identification information such that, in the registration process, an attendance type input prior to the input of the identification information is subjected to attendance registration in association with the identification information when the input received in the reception process is input by the first input method through the first input device, and
    wherein the predetermined timing for the second input method is after the input of the identification information such that, in the registration process, an attendance type input after the input of the identification information is subjected to attendance registration in association with the identification information when the input received in the reception process is input by the second input method through the second input device.

2. The attendance registration device according to claim 1, wherein:
    the first input method is a method of inputting the identification information using near field communication or a method of inputting the identification information using a biometric authentication sensor, and
    the second input method is a method of inputting the identification information by a manual input operation performed by the user on the attendance registration device.

3. The attendance registration device according to claim 1, further comprising:
    a display,
    wherein the processor further executes a display control process comprising displaying a plurality of selectable attendance types on the display and, when selection of any one of the attendance types is input, changing a manner of display of the selected attendance type.

4. The attendance registration device according to claim 3, wherein the display control process comprises displaying the plurality of selectable attendance types in a manner indicated that none of the attendance types has been selected, at a beginning of the input of the identification information by the second method.

5. The attendance registration device according to claim 3, wherein the attendance types include two or more of check-in, check-out, a break start, a break end, leaving, being directly on outside duty, and direct return from outside duty.

6. The attendance registration device according to claim 3, wherein the display control process comprises displaying a notification on the display to prompt input of the attendance type when the identification information is received in the reception process by the first input method in and the attendance type has not yet been input.

7. The attendance registration device according to claim 1, wherein:
    the first input device comprises a Near Field Communication (NFC) reader that performs near field communication with a mobile terminal or an integrated circuit (IC) card,
    the second input device comprises a touch panel display;
    the first input method is inputting the identification information using near field communication via the NFC reader, and
    the second input method is an input operation via the touch panel display.

8. The attendance registration device according to claim 1, wherein:
    the first input device comprises a biometric authentication sensor that receives an input of biometric information relating to the target person,
    the second input device comprises a touch panel display,
    the first input method is inputting the identification information using the biometric authentication sensor, and
    the second input method is an input operation via the touch panel display.

9. An attendance registration method performed by an attendance registration device that includes (i) a first input device configured to receive an input, by a first input method, of identification information of a target person whose attendance is to be registered, and (ii) a second input device which is different from the first input device and is configured to receive an input, by a second input method which is different from the first input method, of the identification information of the target person whose attendance is to be registered, the method comprising:
    a reception step including receiving the input of the identification information of the target person by the first input method through the first input device or by the second input method through the second input device, and determining which one of the first input method or the second input method has been used to perform the input of the identification information; and
    a registration step comprising registering attendance of the target person by associating the identification information received in the reception step with an attendance type input at a predetermined timing, the predetermined timing being different for the first input method than for the second input method,
    wherein the predetermined timing for the first input method is prior to the input of the identification information such that, in the registration step, an attendance type input prior to the reception step is subjected to attendance registration in association with the identification information when the input received in the reception step is input by the first input method through the first input device, and wherein the predetermined timing for the second input method is after the input of the identification information such that, in the registration step, an attendance type input after the reception step is subjected to attendance registration in association with the identification information when the input received in the reception step is input by the second input method through the second input device.

10. The attendance registration method according to claim 9, wherein:

the first input method is a method of inputting the identification information using near field communication or a method of inputting the identification information using a biometric authentication sensor, and the second input method is a method of inputting the identification information by a manual input operation performed by the user on the attendance registration device.

11. The attendance registration method according to claim 9 further comprising a display control step comprising displaying a plurality of selectable attendance types on a display unit and, when selection of any one of the attendance types is input, changing a manner of display of the selected attendance type.

12. The attendance registration method according to claim 11, wherein the display control step comprises displaying the plurality of selectable attendance types in a manner indicated that none of the attendance types has been selected, at a beginning of the input of the identification information by the second method.

13. The attendance registration method according to claim 11, wherein the attendance types include two or more of check-in, check-out, a break start, a break end, leaving, being directly on outside duty, and direct return from outside duty.

14. The attendance registration method according to claim 11, wherein the display control step comprises displaying a notification on the display to prompt input of the attendance type when the identification information is received in the reception step by the first input method in the display control step and the attendance type has not yet been input.

15. A non-transitory computer-readable recording medium storing a program that is executable by a computer of an attendance registration device that includes (i) a first input device configured to receive an input, by a first input method, of identification information of a target person whose attendance is to be registered, and (ii) a second input device which is different from the first input device and is configured to receive an input, by a second input method which is different from the first input method, of the identification information of the target person whose attendance is to be registered, the program being executable by the computer to execute a procedure comprising:

a reception process including receiving the input of the identification information of the target person by the first input method through the first input device or by the second input method through the second input device, and determining which one of the first input method or the second input method has been used to perform the input of the identification information; and a registration process comprising registering attendance of the target person by associating the identification information received in the reception process with an attendance type input at a predetermined timing, the predetermined timing being different for the first input method than for the second input method, wherein the predetermined timing for the first input method is prior to the input of the identification information such that, in the registration process, an attendance type input prior to the input of the identification information is subjected to attendance registration in association with the identification information when the input received in the reception process is input by the first input method through the first input device, and wherein the predetermined timing for the second input method is after the input of the identification information such that, in the registration process, an attendance type input after the input of the identification information is subjected to attendance registration in association with the identification information when the input received in the reception process is input by the second input method through the second input device.

16. The recording medium according to claim 15, wherein:

the first input method is a method of inputting the identification information using near field communication or a method of inputting the identification information using a biometric authentication sensor, and the second input method is a method of inputting the identification information by a manual input operation performed by the user on the attendance registration device.

17. The recording medium according to claim 15, wherein the procedure further comprises a display control process comprising displaying a plurality of selectable attendance types on a display and, when selection of any one of the attendance types is input, changing a manner of display of the selected attendance type.

18. The recording medium according to claim 17, wherein the display control process comprises displaying the plurality of selectable attendance types in a manner indicated that none of the attendance types has been selected, at a beginning of the input of the identification information by the second method.

19. The recording medium according to claim 17, wherein the attendance types include two or more of check-in, check-out, a break start, a break end, leaving, being directly on outside duty, and direct return from outside duty.

20. The recording medium according to claim 17, wherein the display control process comprises displaying a notification on the display to prompt input of the attendance type when the identification information is received in the reception process by the first input method and the attendance type has not yet been input.

* * * * *

UNITED STATES PATENT AND TRADEMARK OFFICE
CERTIFICATE OF CORRECTION

PATENT NO. : 10,885,498 B2
APPLICATION NO. : 16/170797
DATED : January 5, 2021
INVENTOR(S) : Toshitatsu Ishida et al.

Page 1 of 1

It is certified that error appears in the above-identified patent and that said Letters Patent is hereby corrected as shown below:

In the Claims

Column 13, Line 24 Claim 1, after "information" delete "a".
Column 14, Line 18 Claim 3, after "method" delete "in".
Column 15, Line 27 Claim 11, after "display" delete "unit".
Column 15, Lines 45-46 Claim 14, after "method" delete "in the display control step".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*